United States Patent
Schadewaldt et al.

(10) Patent No.: US 9,760,993 B2
(45) Date of Patent: Sep. 12, 2017

(54) SUPPORT APPARATUS FOR SUPPORTING A USER IN A DIAGNOSIS PROCESS

(71) Applicant: KONINKLIJKE PHILIPS N.V., Eindhoven (NL)

(72) Inventors: Nicole Schadewaldt, Norderstedt (DE); Julien Senegas, Hamburg (DE); Steffen Renisch, Hamburg (DE); Heinrich Schulz, Hamburg (DE)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 14/767,921

(22) PCT Filed: Mar. 19, 2014

(86) PCT No.: PCT/IB2014/059961
§ 371 (c)(1),
(2) Date: Aug. 14, 2015

(87) PCT Pub. No.: WO2014/155243
PCT Pub. Date: Oct. 2, 2014

(65) Prior Publication Data
US 2016/0217570 A1 Jul. 28, 2016

Related U.S. Application Data

(60) Provisional application No. 61/805,246, filed on Mar. 26, 2013.

(51) Int. Cl.
*G06T 7/00* (2017.01)
*G06T 7/33* (2017.01)
*G06T 7/149* (2017.01)

(52) U.S. Cl.
CPC .......... *G06T 7/0014* (2013.01); *G06T 7/0012* (2013.01); *G06T 7/149* (2017.01);
(Continued)

(58) Field of Classification Search
CPC ... G06T 7/0012; G06T 7/0089; G06T 7/0032; G06T 7/0014; G06T 2207/10088;
(Continued)

(56) References Cited

U.S. PATENT DOCUMENTS 8,265,355 B2  9/2012  Zhao et al.
8,965,070 B2  2/2015  Bredno
(Continued)

FOREIGN PATENT DOCUMENTS

JP  2011085689 A  4/2011
KR  101126224 B1  6/2012
WO  2008085193 A2  7/2008

OTHER PUBLICATIONS

Moschidis et al. "Automatic Differential Segmentation of the Prostate in 3-D MRI Using Random Forest Classification and Graph-Cuts Optimization." 9th International Symposium on Biomedical Imaging, May 2, 2012, pp. 1727-1730.*
Yang et al. "Prostate Segmentation in MR Images Using Discriminant Boundary Features." IEEE Transactions on Biomedical Engineering, vol. 60, No. 2, Feb. 2013, pp. 479-488.*
(Continued)

*Primary Examiner* — Jon Chang

(57) ABSTRACT

The invention relates to a support apparatus (1) for supporting a user in a diagnosis process, especially for assisting a physician in staging prostate cancer. A segmentation unit (3) determines three-dimensional segments of an anatomical object like a prostate based on a three-dimensional image being preferentially a magnetic resonance image, wherein the segments comprise anatomical segment boundaries and non-anatomical segment boundaries. A visualization generating unit (4) generates a visualization of the segments in the image, a graphical user interface providing unit (5) provides a graphical user interface allowing the user to assign scores to the determined three-dimensional segments, and a display (9) displays the visualization and the graphical user interface. Thus, an automatic delineation of segments may be provided to which a user like a physician can assign scores, wherein based on the scores assigned to the segments a diagnosis can be performed, in particular, prostate cancer can be staged.

15 Claims, 6 Drawing Sheets

(52) U.S. Cl.
CPC .......... *G06T 7/344* (2017.01); *G06T 2200/24* (2013.01); *G06T 2207/10088* (2013.01); *G06T 2207/20104* (2013.01); *G06T 2207/30081* (2013.01)

(58) Field of Classification Search
CPC ....... G06T 2200/24; G06T 2207/30081; G06T 2207/20104; G06T 7/149; G06T 7/344; A61B 5/4381; A61B 5/743; A61B 5/7435; A61B 6/46; A61B 6/469
See application file for complete search history.

(56) References Cited

U.S. PATENT DOCUMENTS

| | | | |
|---|---|---|---|
| 9,047,539 | B2 | 6/2015 | Ranjan et al. |
| 9,521,994 | B2 | 12/2016 | Kamen et al. |
| 2004/0184644 | A1* | 9/2004 | Leichter ................ G06K 9/033 382/128 |
| 2005/0148852 | A1 | 7/2005 | Tank |
| 2008/0232655 | A1 | 9/2008 | Wiemker et al. |
| 2010/0172559 | A1 | 7/2010 | Kumar et al. |
| 2010/0329529 | A1* | 12/2010 | Feldman .............. G06K 9/6252 382/131 |
| 2011/0046979 | A1 | 2/2011 | Tulipano et al. |
| 2011/0268362 | A1 | 11/2011 | Toma et al. |
| 2013/0034282 | A1* | 2/2013 | Kaufman .............. G06T 7/0014 382/128 |
| 2013/0050239 | A1* | 2/2013 | Karssemeijer ......... A61B 6/469 345/589 |

OTHER PUBLICATIONS

Lenkinski. "The Role of Magnetic Resonance Imaging in Prostate Cancer Imaging and Staging." IEEE International Symposium on Biomedical Imaging: From Nano to Macro, Mar. 30, 2011, pp. 2109-2112.*

Firjani et al. "Non-Invasive Image-based Approach for Early Detection of Prostate Cancer." Developments in E-Systems Engineering, Dec. 6, 2011, pp. 172-177.*

Fenster et al. "Three-Dimensional Ultrasound Imaging System for Prostate Cancer Diagnosis and Treatment." IEEE Transactions on Instrumentation and Measurement, vol. 47, No. 6, Dec. 1998, pp. 1439-1447.*

Dickinson, L. et al. "Magnetic resonance imaging for teh detection, localization, and characterization of prostate cancer: recommendations from a European consensus meeting", European Association of Urology, vol. 59, pp. 495-497 (Dec. 2010).

Ecabert, O. et al., "Automatic model-based segmentation of the heart in CT images", IEEE Transactions on Medical Imaging, vol. 27 (9), pp. 1189-1201 (Sep. 2008).

Martin, S. et al., "Automated segmentation of the prostate in 3D MR Images using a probabilistic atlas adn a spatially constrained deformable model", Author manuscript, published in Medical Physics (2010).

Barentsz, J.O. et al., "ESUR prostate MR guidelines 2012", Eur Radiol, published online Feb. 10, 2012.

Soumya, G. et al., "A survey of prostate segmentation methodologies in ultrasound, magnetic resonance and computer tomography images" Computer Methods and Programs in Biomedicine, Elsevier, 2012.

* cited by examiner

SUPPORT APPARATUS FOR SUPPORTING A USER IN A DIAGNOSIS PROCESS

CROSS-REFERENCE TO PRIOR APPLICATIONS

This application is the U.S. National Phase application under 35 U.S.C, §371 of International Application Serial No. PCT/IB2014/059961, filed on Mar. 19, 2014, which claims the benefit of U.S. Application Ser. No. 61/805,246, filed on Mar. 26, 2011 These applications are hereby incorporated by reference herein.

FIELD OF THE INVENTION

The invention relates to a support apparatus, a support method and a support computer program for supporting a user in a diagnosis process.

BACKGROUND OF THE INVENTION

According to the prostate magnetic resonance guidelines published by the European Society of Urogenital Radiology (ESUR), European Radiology, volume 22 (4), pages 746 to 757 (April 2012), a radiologist has to evaluate and score all lesions found in different segments of the prostate, in order to perform prostate cancer staging. In particular, the radiologist has to mentally divide the prostate into 16 or 27 segments and to score each of the segments individually with respect to number, size and appearance of detected lesions, wherein the radiologist needs to keep track of which score the radiologist has assigned to which segment. The prostate segmentation is highly user dependent and case dependent such that it is difficult to assure consistency of the subdivisions between different radiologists and even between different readings by the same radiologist. The diagnosis process may therefore not lead to reliable results.

SUMMARY OF THE INVENTION

It is an object of the present invention to provide a support apparatus, a support method and a support computer program, which allow for a more reliable diagnosis.

In a first aspect of the present invention a support apparatus for supporting a user in a diagnosis process is presented, wherein the support apparatus comprises:
an image providing unit for providing a three-dimensional image of an anatomical object,
a segmentation unit for determining three-dimensional segments of the object based on the provided three-dimensional image, wherein the segments comprise anatomical segment boundaries and non-anatomical segment boundaries,
a visualization generating unit for generating a visualization of the segments in the image,
a graphical user interface providing unit for providing a graphical user interface allowing the user to assign scores to the determined three-dimensional segments, and
a display for displaying the visualization and the graphical user interface.

Since the segmentation unit determines three-dimensional segments of the object based on the provided three-dimensional image, wherein the segments comprise anatomical segment boundaries and non-anatomical segment boundaries, i.e. since a lot of different three-dimensional segments are automatically determined, which are not limited to anatomical segments, which are visualized in the image and to which the user can assign scores by using the graphical user interface, many assignments of scores to reliably determined three-dimensional segments of the anatomical object are possible. These numerous possibilities to assign scores to reliably determined three-dimensional segments, i.e. to three-dimensional segments not being user-dependent and case-dependent, allows for a detailed and reliable diagnosis.

The image providing unit is preferentially adapted to provide a three-dimensional magnetic resonance image of the anatomical object. However, the image providing unit can also be adapted to provide another image like an x-ray computed tomography image, a nuclear image such as a positron emission tomography or a single photon emission computed tomography image, an ultrasound image, et cetera of the anatomical object.

The anatomical object is preferentially the prostate of a person, wherein the support apparatus is preferentially adapted to support in staging cancer of the prostate. However, in another embodiment the support apparatus can also be adapted to stage cancer in another part of a person, in particular, in another organ. Moreover, the support apparatus can be adapted to support a user in another kind of diagnosis. Furthermore, the support apparatus may also be adapted to support a user in a diagnosis process applied to an animal.

The image providing unit is preferentially a storing unit, in which the three-dimensional image of the anatomical object is stored and from which the three-dimensional image can be provided. However, the image providing unit can also be a receiving unit for receiving a three-dimensional image of an anatomical object from another device like an imaging system generating the three-dimensional image. The image providing unit can also be the imaging system generating the three-dimensional image.

The segmentation unit is adapted to determine three-dimensional segments, i.e. to perform also an internal segmentation and not a surface segmentation only, wherein it is preferentially adapted to determine the 16 or 27 prostate segments described in the article "Magnetic resonance imaging for the detection, localization, and characterization of prostate cancer: recommendations from a European consensus meeting" by L. Dickinson et al., European Association of Urology, volume 59, pages 495 to 497 (December 2010). The visualization generating unit is preferentially adapted to generate an overlay view comprising an overlay of the determined segments on the provided image. An overlaid segment may be indicated by, for instance, a colored area, an outline, et cetera. The visualization generating unit may also be adapted to mark the segments with labels identifying the different segments.

It is preferred that the segmentation unit is adapted to determine the three-dimensional segments by a) providing an anatomical model of the object, wherein the anatomical model comprises anatomical segment boundaries and non-anatomical segment boundaries, b) detecting anatomical features of the object, which correspond to the anatomical boundaries of the anatomical model, in the three-dimensional image, and c) adapting the anatomical model of the object by adapting the anatomical segment boundaries to the detected anatomical features, wherein the segments are defined by the anatomical and non-anatomical segment boundaries of the adapted anatomical model. This allows reliably determining the three-dimensional segments of the object in the image with relatively low computational efforts.

The support apparatus may further comprise a property value determination unit for determining for a determined three-dimensional segment a property value, which is indicative of a property of the segment, based on image values of the segment. For instance, the property value determination unit can be adapted to determine an average apparent diffusion coefficient (ADC) based on a corresponding segment of a provided ADC magnetic resonance image. However, the property value determination unit can also be adapted to determine another anatomical, functional or statistical value as a property value for a segment like an average diffusion weighted value (DWI value) based on a corresponding segment of a DWI magnetic resonance image. The property value determination unit may be adapted to determine for each segment a corresponding property value. The determined property value may be shown, for instance, on the display.

It is further preferred that the image providing unit is adapted to provide different images of the anatomical object, wherein the segmentation unit is adapted to determine the three-dimensional segments of the object based on one or several provided images, wherein the visualization generating unit is adapted to generate a visualization of the segments in the images. The different images are preferentially different registered parametric magnetic resonance images of the object. Thus, the image providing unit can be adapted to provide, for instance, a T2-weighted magnetic resonance image, a dynamic contrast-enhanced (DCE) magnetic resonance image, a DWI magnetic resonance image and an ADC magnetic resonance image. The segmentation unit may be adapted to determine the three-dimensional segments based on one or several of these images. For instance, the segmentation unit can be adapted to determine the segments based on the T2-weighted magnetic resonance image and/or the DCE magnetic resonance image only, wherein the determined segments can then also be shown on the DWI magnetic resonance image and the ADC magnetic resonance image. Since these images are registered with respect to each other, the segments can be visualized in an image, although the segments have been determined based on another image.

The image providing unit can be adapted to provide different images generated by different imaging modalities. For example, a first image can be a magnetic resonance image and a second image can be a computed tomography image. This allows the user, which is preferentially a radiologist, to consider features of the anatomical object, which are visible in one of these images, but not in the other of these images. Using several images, which have been generated by different imaging modalities, can therefore improve the diagnosis.

The different images are preferentially registered with respect to each other. Moreover, the image providing unit may be adapted to provide an anatomical three-dimensional image and a functional image and to register the anatomical image with the functional image, wherein the segmentation unit may be adapted to determine the three-dimensional segments of the object based on the anatomical image and wherein the visualization generating unit may be adapted to generate a visualization of the segments in the anatomical image and in the functional image, wherein in the functional image the segments are visualized based on the registration between the anatomical image and the functional image. Generally, it is difficult to determine three-dimensional segments of an anatomical object based on a functional image. By registering the anatomical image with the functional image and by determining the three-dimensional segments based on the anatomical image, the determined three-dimensional segments can also be shown in the functional image. This allows the user to assign a score to a segment based on a visualization of this segment in the anatomical image and based on a further visualization of this segment in the functional image, which can lead to a further improved diagnosis.

It is preferred that the graphical user interface providing unit is adapted to provide a graphical user interface allowing the user to modify the segments. This allows the user to correct a segmentation, if the user observes an error in the segmentation.

It is further preferred that the graphical user interface providing unit is adapted to provide a graphical user interface allowing the user to indicate that the assignment of a score to a segment has been completed, wherein the visualization generating unit is adapted to generate a visualization visualizing for which segments the assigning of scores has been completed. This allows the user to more easily keep track of which segments have already been reviewed, thereby speeding up and simplifying the diagnosis process.

It is also preferred that the visualization generating unit is adapted to generate a visualization visualizing all segments simultaneously or visualizing only a single segment at a time. Thus, the user may be able to compare different segments or to concentrate the review on a single segment only.

The visualization generating unit is preferentially adapted to generate a visualization of the segments in a two-dimensional view of the three-dimensional image. In particular, the user can review the different segments in different two-dimensional views of the three-dimensional image, wherein in each two-dimensional view the user can reliably see which part of the respective two-dimensional view corresponds to which segment and optionally also whether to the respective segment a score has already been assigned based on another two-dimensional view of the three-dimensional image. Thus, the support apparatus allows keeping track of the score assigning process, even if the user reviews the three-dimensional image in different arbitrary two-dimensional views of the three-dimensional image.

The support apparatus preferentially further comprises a report generation unit for generating a report about the diagnosis process based on the assignments between scores and segments. Thus, the assignments of the scores to the different segments can be included in the report together with optional further information like comments, which the user may have input into the support apparatus by using the graphical user interface. This report is very reliable, because it is based on the assignments of the scores to the reliably determined three-dimensional segments comprising anatomical and non-anatomical segment boundaries.

The support apparatus preferentially further comprises a workflow providing unit providing a workflow of tasks defining an order of visualizing the segments, wherein the visualization generating unit is adapted to generate visualizations of the segments in accordance with the order defined by the workflow. The segments can therefore be shown in a certain predefined order to the user, in order to guide the user through the diagnosis process in a suitable way. If different users are guided through the diagnosis process in the same way, the comparability of diagnosis processes performed by different users and, thus, the reliability of the diagnosis process can be further improved. Moreover, by being guided in this way, the diagnosis process may be faster, because the user may not unintendedly try to assign a score to a segment, to which a score has been assigned already.

The visualization unit and the graphical user interface providing unit can be adapted to allow the user to view the determined segments and assign scores to the determined segments in an arbitrary order, wherein the visualization generating unit can be adapted to generate a visualization indicating remaining segments to which a score has not been assigned. The generation of this visualization of the remaining segments and the displaying of this visualization can be triggered by, for instance, the user via an accordingly adapted graphical user interface. However, the visualization of the remaining segments can also be triggered by another event. For example, if the user wants to generate a report, firstly the remaining segments may be shown and the user may be asked to assign scores also to these segments. This order of tasks, i.e. firstly assigning scores to the segments in an arbitrary order, wherein, before a report is generated, remaining segments are visualized and the user is asked to assign scores also to the remaining segments, can be defined by a workflow provided by the workflow providing unit.

In a further aspect of the present invention a support method for supporting a user in a diagnosis process is presented, wherein the support method comprises:
 providing a three-dimensional image of an anatomical object by an image providing unit,
 determining three-dimensional segments of the object based on the provided three-dimensional image by a segmentation unit, wherein the segments comprise anatomical segment boundaries and non-anatomical segment boundaries,
 generating a visualization of the segments in the image by a visualization generating unit,
 providing a graphical user interface allowing the user to assign scores to the determined three-dimensional segments by a graphical user interface providing unit, and
 displaying the visualization and the graphical user interface by a display.

In a further aspect of the present invention a support computer program for supporting a user in a diagnosis process is presented, wherein the support computer program comprises program code means for causing a support apparatus as defined in claim 1 to carry out the steps of the support method as defined in claim 14, when the support computer program is run on a computer controlling the support apparatus.

It shall be understood that the support apparatus, the support method, and the support computer program as disclosed herein have similar and/or identical preferred embodiments, in particular, as defined in the claims.

It shall be understood that a preferred embodiment of the invention can also be any combination of the dependent claims with the respective independent claim.

These and other aspects of the invention will be apparent from and elucidated with reference to the embodiments described hereinafter.

DETAILED DESCRIPTION OF EMBODIMENTS

Figure 1:
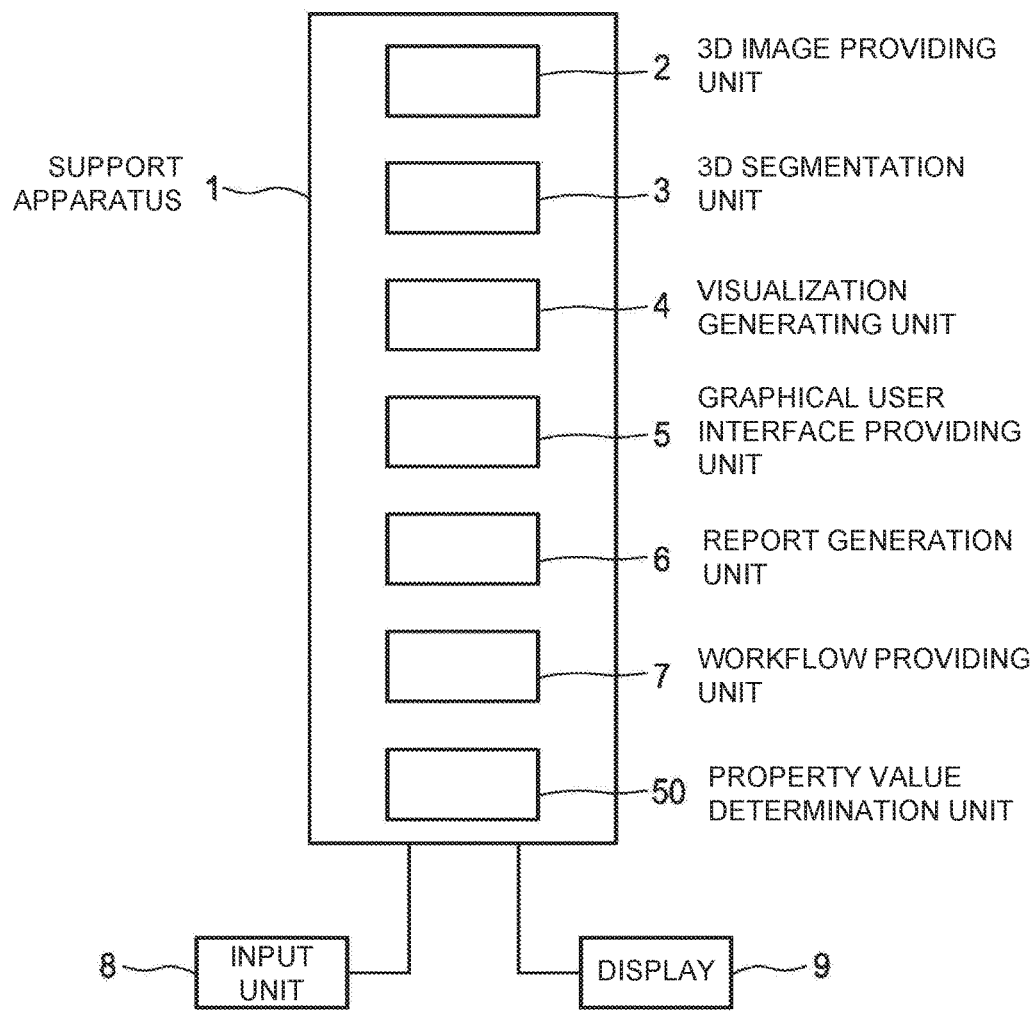
FIG. 1 shows schematically and exemplarily an embodiment of a support apparatus for supporting a user in a diagnosis process.

FIG. 1 shows schematically and exemplarily an embodiment of a support apparatus for supporting a user in a diagnosis process. In this embodiment the support apparatus 1 is adapted to support in prostate cancer staging. The support apparatus 1 comprises an image providing unit 2 for providing a three-dimensional image of a prostate and a segmentation unit 3 for determining three-dimensional segments of the prostate based on the provided three-dimensional image, wherein the segments comprise anatomical segment boundaries and non-anatomical segment boundaries. The support apparatus 1 further comprises a visualization generating unit 4 for generating a visualization of the segments in the image, a graphical user interface providing unit 5 for providing a graphical user interface allowing the user to assign scores to the determined three-dimensional segments and a display 9 for displaying the visualization of the segments in the image and for displaying the graphical user interface.

In this embodiment the image providing unit 2 is adapted to provide multiparametric magnetic resonance images, in particular, a T2-weighted magnetic resonance image, a DCE magnetic resonance image, a DWI magnetic resonance image and an ADC magnetic resonance image of the prostate. The image providing unit 2 is a storing unit, in which the magnetic resonance images are stored and from which the stored magnetic resonance images can be provided. However, in another embodiment the image providing unit 2 can also be a receiving unit for receiving the magnetic resonance images and for providing the received magnetic resonance images. The image providing unit 2 can also be a magnetic resonance imaging system generating the magnetic resonance images and providing the generated magnetic resonance images.

The segmentation unit 3 is adapted to use one or several of the magnetic resonance images for generating the three-dimensional segments in the images. The different magnetic resonance images are registered with respect to each other such that, if the three-dimensional segments are determined based on one or several of the magnetic resonance images, but not based on all magnetic resonance images, the determined segments can also be shown on the magnetic resonance images, which have not been used for determining the segments. In this embodiment the T2-weighted magnetic resonance image is used for determining the three-dimensional segments in the three-dimensional magnetic resonance images.

The segmentation unit 3 is preferentially adapted to determine the three-dimensional segments by a) providing an anatomical model of the object, wherein the anatomical model comprises anatomical segment boundaries and non-anatomical segment boundaries, b) detecting anatomical features of the object, which correspond to the anatomical boundaries of the anatomical model, in one or several three-dimensional images, and c) adapting the anatomical model of the object by adapting the anatomical segment boundaries to the detected anatomical features, wherein the segments are defined by the anatomical and non-anatomical segment boundaries of the adapted anatomical model. In particular, the anatomical model may be a multi-compartment model of the prostate, which is adapted to the T2-weighted magnetic resonance image using, for instance, the technique described in the article "Automatic model-based segmentation of the heart in CT images" by O. Ecabert et al., IEEE Transactions on Medical Imaging, volume 27 (9), pages 1189 to 1201 (September 2008), which is herewith incorporated by reference. Thus, the boundaries of the prostate segments may be automatically estimated using an anatomical model, which may be regarded as being a combination of an image-adaptive prostate appearance model and attached non-anatomical segment boundaries.

The segmentation is preferentially performed without needing any user-interaction. However, if the user observes on the display 9 displaying the visualization of the determined segments in the image that the segmentation can be improved, the user can modify the segments by using the graphical user interface, i.e. the graphical user interface providing unit 5 is adapted to provide the graphical user interface such that the user can modify the segments. The graphical user interface can provide interaction tools like paintbrush, in order to extend or diminish individual prostate segments to satisfaction.

Since the segments are preferentially determined based on the T2-weighted magnetic resonance image and since the T2-weighted magnetic resonance image is registered with respect to the DWI magnetic resonance image, the ADC magnetic resonance image, which can also be regarded as being an ADC map, and the DCE magnetic resonance image, the visualization may switch between the anatomical magnetic resonance images and the functional magnetic resonance images, in order to display the determined prostate segments on either image. The registration can be performed by the visualization generating unit 4 by using known image registration techniques, which may be based on image features visible in each of these images.

The visualization generating unit 4 is preferentially adapted to generate a visualization of the segments in two-dimensional views of the three-dimensional images. Thus, the visualization unit 4 can be adapted to generate different two-dimensional views of the different magnetic resonance images, wherein in each of the two-dimensional views the determined segments are visualized. The graphical user interface may be adapted to allow the user to request a certain two-dimensional view of a certain three-dimensional magnetic resonance image with the visualized determined segments. However, the different two-dimensional views of the different three-dimensional magnetic resonance images with the visualized determined segments can also be generated and displayed in accordance with a workflow provided by a workflow providing unit 7. The workflow providing unit 7 may be adapted to provide a workflow of tasks defining an order of visualizing the segments, i.e. an order of which segments should be shown in which two-dimensional views of which three-dimensional magnetic resonance images, wherein the visualization generating unit 4 can be adapted to generate the visualizations of the segments in accordance with the order defined by the workflow.

The support apparatus 1 comprises an input unit 8 like a keyboard, a computer mouse, a touchpad, et cetera for allowing the user to interact with the support apparatus 1 by using the graphical user interface providing unit 5.

In order to display the determined prostate segments on the magnetic resonance images, the visualization generating unit 4 may be adapted to generate a visualization showing the segments as a colored overlay, outlines, a masking or in any other way that communicates the boundaries of the segments to the user. The segmentation unit 3 may be adapted to determine the 16 or 27 prostate segments defined in the above mentioned ESUR prostate magnetic resonance guidelines and the above mentioned article by Dickinson et al.

The visualization generating unit 4 may be adapted to show labels labeling the determined segments, wherein the labels may just be different color or alphanumerical labels, which may be directly shown on the respective segment. However, the labels may be permanently shown or only, if requested by the user, for instance, only if a mouse pointer points to the respective segment. Moreover, the visualization generating unit 4 can generate a visualization of the segments in an image, which shows all segments simultaneously, which shows a single segment only or which shows all segments, but which highlights only one of these segments. The graphical user interface providing unit 5 is preferentially adapted to provide the graphical user interface such that a user menu is provided, which allows the user to switch between the different visualizations. Thus, the determined segments can be superimposed together with their labels, in particular, together with their names, onto any of multiparametric magnetic resonance data set displays, wherein the user can switch between views, for example, by scrolling or tilting, while evaluating one segment, in order to better stage individual lesions, without losing track of the current segment.

The user studies possible lesions within the respective segment and assigns a score to the respective segment based on the result of studying the lesions in the respective segment. After a lesion has been studied, the user can mark the lesion, in order to indicate that the studying of this lesion has been completed. For instance, the user may mark the lesion as "staged" or "finished". Moreover, after the user has assigned a score to a segment, the user may also mark the segment for indicating that the scoring of this segment has been completed. For example, the user may also be able to mark a segment as "staged" or "finished". Thus, the graphical user interface providing unit 5 may be adapted to provide the graphical user interface such that the user is allowed to indicate that the studying of a lesion and/or the assignment of a score to a segment has been completed, wherein the visualization generating unit 4 can be adapted to generate a visualization visualizing for which lesions the studying has been completed and/or for which segments the assigning of the scores has been completed. This use of the visualization for allowing a user to mark a lesion and/or a segment as, for instance, "finalized" or "done", allows the user to go through the segments in any order, which the user finds useful, and to still keep an overview over the procedure.

The support apparatus 1 further comprises a report generation unit 6 for generating a report about the cancer staging process based on the assignments between scores and segments. The graphical user interface providing unit 5 can be adapted to provide the graphical user interface such that the user has also the possibility to stage and/or comment lesions and segments, wherein the visualization generating unit 4 can be adapted to visually couple the corresponding information to the lesions and/or segments. The report generation unit 6 can be adapted to include this additional information assigned to the lesions and/or segments into the report. Also further information like screen shots generated from the visualization of the segments and possible markings on the images may be included in the report. The report generation unit 6 may be adapted to automatically generate the report during the diagnosis process.

In an embodiment the visualization generating unit 4 and the graphical user interface providing unit 5 are adapted to allow the user to view the determined segments and assign scores to the viewed determined segments in an arbitrary order, wherein the visualization generating unit 4 is adapted to generate a visualization indicating remaining segments to which a score has not been assigned. The presentation of remaining segments may be triggered by the user at any stage of the process. The trigger may also be the attempt to generate a report without having scored all segments. The workflow providing unit 7 can be adapted to provide a corresponding workflow defining that the user is allowed to assign the scores to the segments in an arbitrary order, but that, before a report can be generated, to all segments scores must have been assigned, wherein the workflow can define that, after the user has tried to generate the report, the user is guided by visualizing the remaining segments, wherein the remaining segments may be shown in a certain order defined by the workflow, in order to allow the user to assign scores to the segments in this order, or the workflow may allow the user to assign the scores to remaining segments in an arbitrary order.

Figure 2:
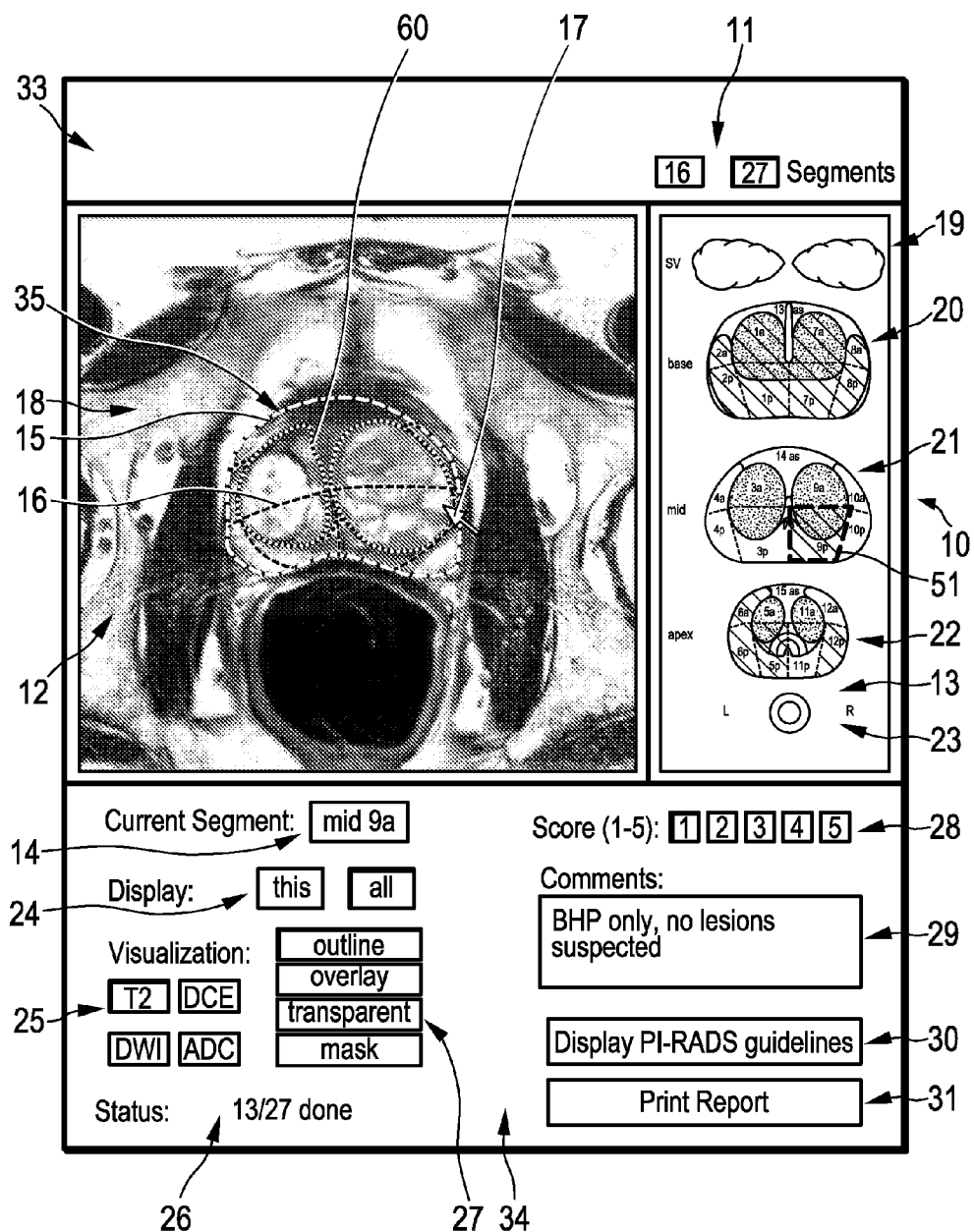
FIG. 2 shows schematically and exemplarily a graphical user interface with a visualization of segments on an image.

FIG. 2 schematically and exemplarily shows a visualization of segments on an image integrated with a graphical user interface 10 shown on the display 9. The graphical user interface 10 shown in FIG. 2 comprises four main regions, i.e. a first main region 33, a second main region 12, a third main region 13 and a fourth main region 34. The first main region 33 forms an upper part of the graphical user interface 10 and comprises a first subregion 11 providing a switch for allowing a user to enter whether the user wants to perform the diagnosis process based on 16 or 27 segments of the prostate.

The second main region 12 forms a left middle part of the graphical user interface 10 and shows a two-dimensional visualization 18 of the three-dimensional T2-weighted magnetic resonance image with outlines representing the segments 35. The outlines may have different colors for distinguishing different segments. Moreover, in this embodiment, anatomical segment boundaries are represented by lines 15 and 60 and non-anatomical segment boundaries are represented by the lines 16.

The third main region 13 forms a right middle part of the graphical user interface 10. It illustrates in a second subregion 19 the seminal vesicle, in a third subregion 20 different segments of the base of the prostate, in a fourth subregion 21 several segments in the mid of the prostate and in a fifth subregion 22 several segments in the apex of the prostate. In the third to fifth subregions 20, 21, 22 segments, which have been marked by the user as being completed, are indicated by a color, for instance, by a green color. The segment currently being evaluated may be indicated by a thicker outline 51. The third main region further comprises a sixth subregion 23 illustrating the orientation of the shown prostate.

The fourth main region 34 comprises a seventh subregion 14, which identifies the current segment and which may contain a drop down menu to switch to another segment, an eighth subregion 24 providing a user menu allowing the user to switch between displaying all segments or only the current segment, a ninth subregion 25 providing a user menu allowing the user to switch between the different magnetic resonance images and a tenth subregion 26 showing how many segments out of the total number of segments indicated in the first subregion 11 have been marked by the user as being completed. The fourth main region 34 further comprises an eleventh subregion 27 providing a user menu allowing the user to switch between different kinds of illustrating the segments on the respective image. For instance, the user may choose an outline visualization, an overlay visualization, a transparent visualization or a mask visualization. In the twelfth subregion 28 a user menu is provided, which allows the user to assign the score to the current segment indicated in the seventh subregion 14. The thirteenth subregion 29 provides a field for allowing a user to enter comments, which will be added to the automatic report, and the fourteenth subregion 30 provides a button, which can be clicked by the user, wherein, if this button has been clicked, prostate imaging, reporting and data system (PI-RADS) guidelines are shown to the user, which are disclosed in above mentioned European Radiology, volume 22 (4) 746 to 757 (April 2012). In a further embodiment the graphical user interface may be configured such that clicking this button opens a conventional PI-RADS score card from the above mentioned guidelines, where the user may enter scores and comments for the report manually in any order. If the user evaluates the segments in a non-specified order, entering scores in the score card might be quicker, then choosing the appropriate segment via, for instance, the options menu 14. In an embodiment the graphical user interface may be adapted such that the user is enabled to set the action of this button via a preference menu, i.e. clicking the button might trigger a submenu to choose for guidelines or a score card, or an additional button for the score card might be added. A fifteenth subregion 31 provides a button, which can be clicked by the user, in order to initiate a printing of the generated report.

Figure 3:
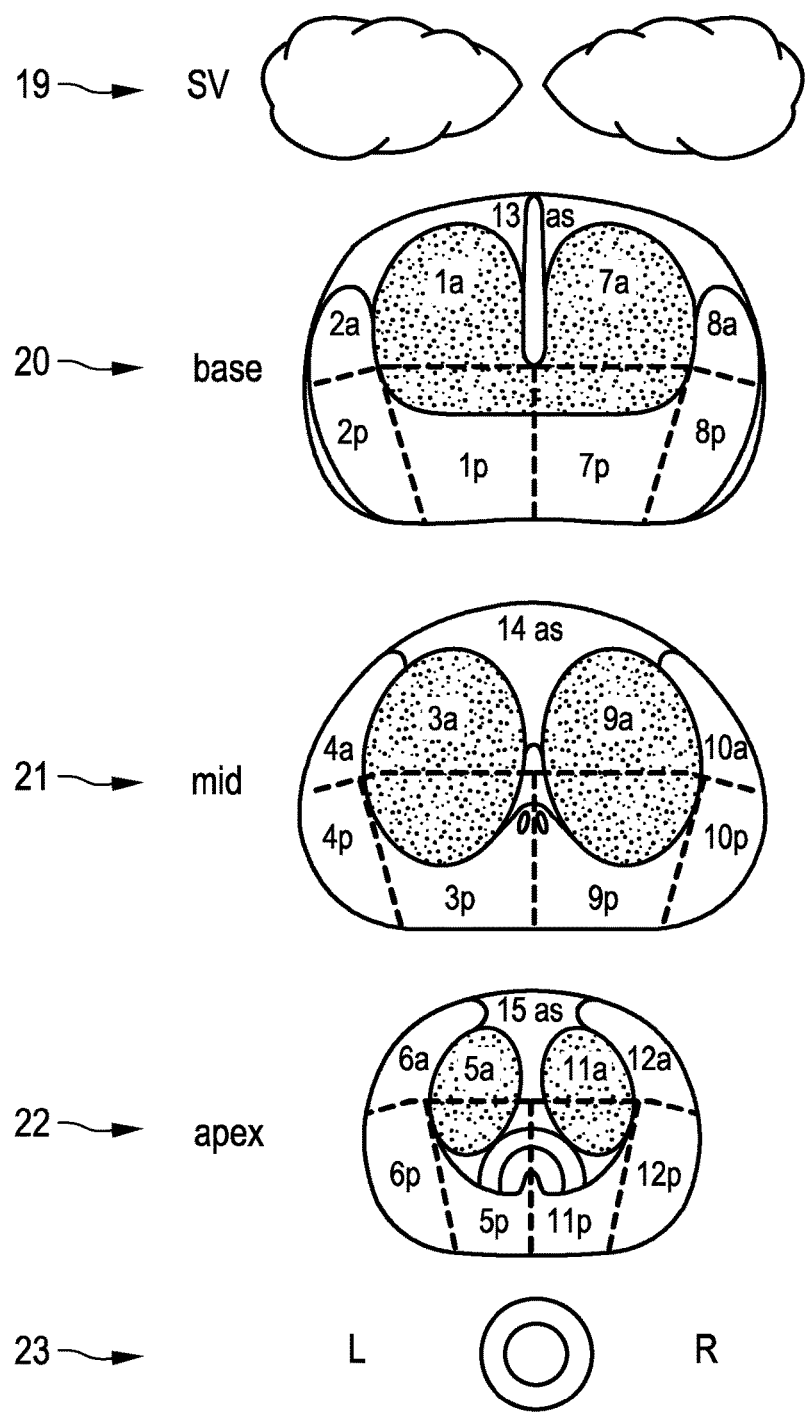
FIG. 3 shows schematically and exemplarily a part of the graphical user interface shown in FIG. 2, which illustrates different segments of a prostate and an orientation of a prostate shown in an image.
Figure 5:
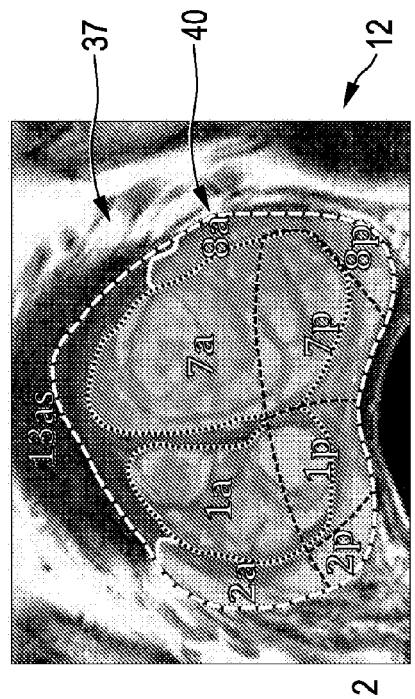
FIGS. 4 to 7 show several segments of the prostate overlaid on images of the prostate.
Figure 7:
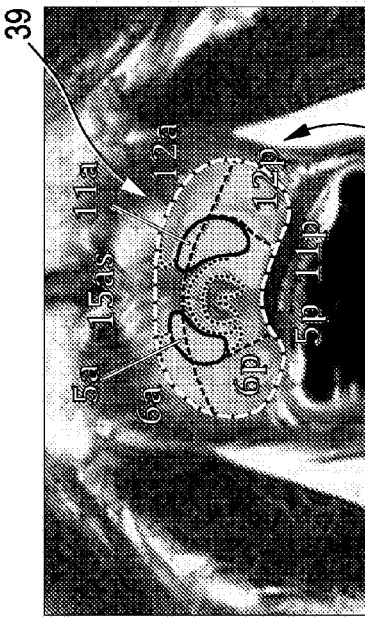
Figure 4:
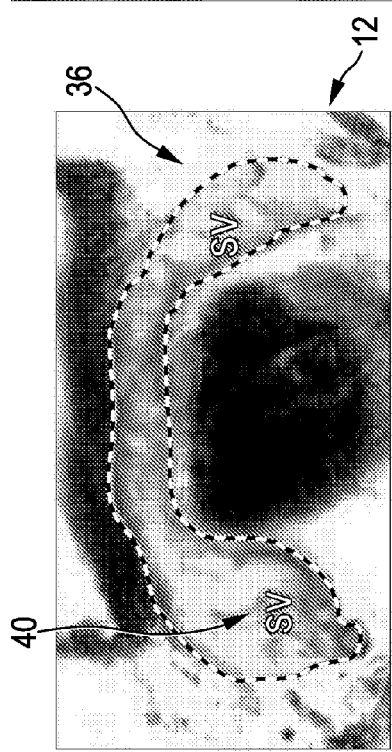
Figure 6:
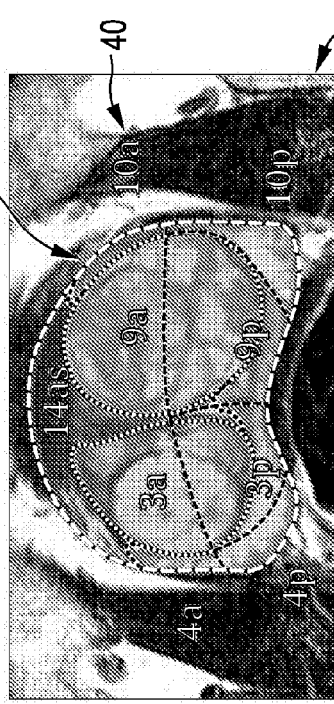

FIG. 3 shows schematically and exemplarily the third main region of the graphical user interface 10 in more detail. FIGS. 4 to 7 show different views of generated visualizations, which may be shown in the second main region 12. In particular, FIG. 4 shows a seminal vesicle segment 36 as a colored overlay over a slice of a magnetic resonance image. FIG. 5 shows segments 37 of the base of the prostate as a colored overlay over a slice of a magnetic resonance image, FIG. 6 shows segments 38 of the mid of the prostate as a colored overlay over a slice of a magnetic resonance image and FIG. 7 shows segments 39 of the apex of the prostate as a colored overlay over a slice of a magnetic resonance image. In FIGS. 4 to 7 the segments are labeled by using labels 40.

Figure 8:
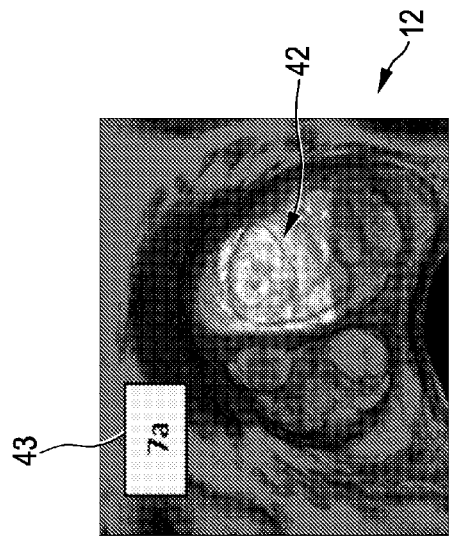
FIG. 8 shows schematically and exemplarily a colored overlay representing a single segment over an image of the prostate.
Figure 9:
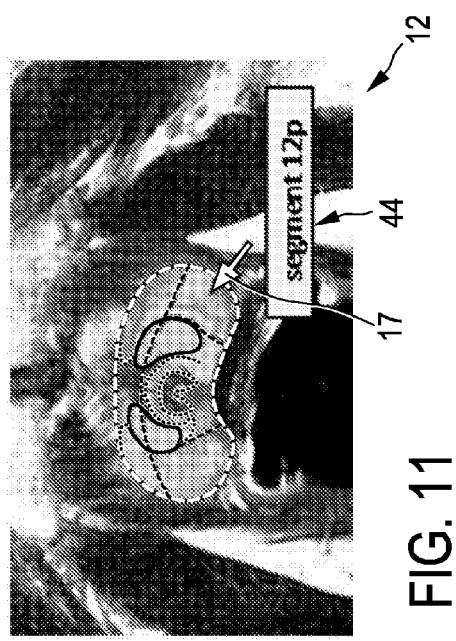
FIG. 9 shows schematically and exemplarily a mask of tunable transparency representing a single segment of the prostate overlaid over an image of the prostate.
Figure 10:
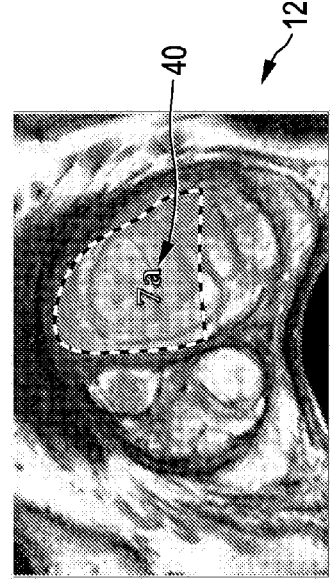
FIG. 10 shows schematically and exemplarily a non-transparent, black mask representing a single segment of the prostate overlaid over an image of the prostate.

If the user has selected in the eighth subregion 24 that not all segments, but only a single segment should be displayed in the second main region 12, the visualization generating unit 4 may generate a visualization of a single segment on a slice of a magnetic resonance image as schematically and exemplarily illustrated in FIG. 8. Thus, in the second main region 12 a colored overlay 41 with a label 40 can be shown overlaid on a slice of a magnetic resonance image, in order to visualize the respective single segment on the magnetic resonance image. The single segment can also be visualized in another way. For instance, it may just be visualized by showing its outline, or, as schematically and exemplarily illustrated in FIG. 9, by a mask of tunable transparency, i.e. in FIG. 9 the part 42, which is not masked by a mask with tunable transparency, indicates the segment labeled by the label 43. The mask can also be a non-transparent, black mask as schematically and exemplarily illustrated in FIG. 10 such that only a region 42 indicating the segment is not masked and can be seen.

Figure 11:
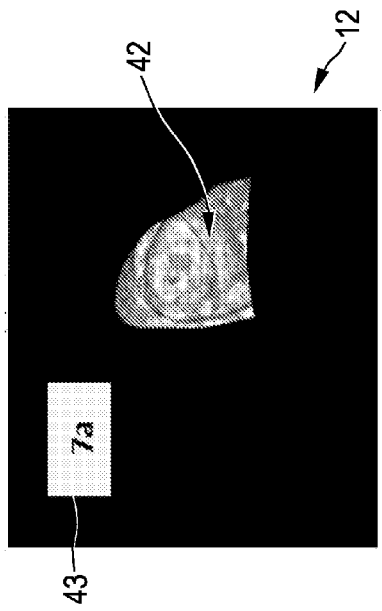
FIG. 11 illustrates schematically and exemplarily a process of showing a label of a segment of the prostate.

The labels of the segments may depend on the respective size of the visualized segments, wherein, if the size of the visualized segments on the display 9 is relatively small, i.e., for instance, smaller than a predefined threshold, the respective segments may not be labeled. However, if the size of the visualization is modified, for instance, by performing a zooming operation, the initially relatively small segments may be enlarged such that also these segments may be labeled. In an embodiment, the labels are visible only, if a mouse pointer 17 has been moved to be above the respective segment as schematically and exemplarily illustrated in FIG. 11, in which the mouse pointer 17 has been moved to the segment 12p and wherein because of this movement to the segment the label 44 is shown.

The support apparatus 1 further comprises a property value determination unit 50 for determining for a determined three-dimensional segment a property value, which is indicative of a property of the segment, based on image values of the segment. For instance, the property value determination unit 50 can be adapted to determine for each segment an average ADC value and/or an average DWI value depending on the respective provided magnetic resonance images. The property value determination unit 50 can also be adapted to calculate other statistical, functional or anatomical values for the anatomical and virtual three-dimensional segments determined by the segmentation unit 3. These property values can be included in the report and/or they can be shown on the display 9. In particular, the determined property values may be accessible by the user via the graphical user interface, for instance, the graphical user interface can comprise a button, wherein the property value determined for the current segment is displayed, if the button is clicked. The property values may be included in the report automatically or via a user request. The property values can be used to further assist the user in the diagnosis process, thereby further improving the diagnosis.

Figure 12:
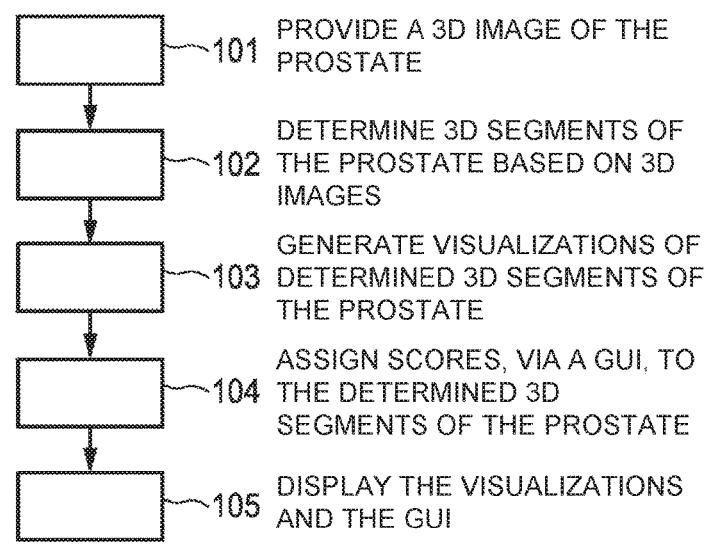
FIG. 12 shows a flowchart exemplarily illustrating an embodiment of a support method for supporting a user in a diagnosis process.

In the following an embodiment of a support method for supporting a user in a diagnosis process will exemplarily be described with reference to a flowchart shown in FIG. 12.

In step 101 a three-dimensional image of the prostate is provided by the image providing unit 2, and in step 102 three-dimensional segments of the prostate are determined based on the provided three-dimensional image by the segmentation unit 3, wherein the segments comprise anatomical segment boundaries and non-anatomical segment boundaries. In step 103 a visualization of the segments in the image is generated by a visualization generating unit 4, and in step 104 a graphical user interface allowing the user to assign scores to the determined segments is provided by the graphical user interface providing unit 5. In step 105 the visualization and the graphical user interface are displayed by the display 9. Step 104 may be performed before step 103.

Multiparametric magnetic resonance imaging is a non-invasive three-dimensional imaging modality with superior contrast, which can be used to accurately assess a cancer stage by scoring individual prostate segments. The support apparatus 1 is preferentially adapted to allow the user to perform the cancer staging along the PI-RADS scoring scheme, wherein the user can score each determined three-dimensional segment of the prostate depending on, for instance, the number, size and appearance of detected lesions, in order to simplify and speed up prostate cancer evaluation along the PI-RADS scoring scheme. Without the support apparatus 1 the user would need to identify and delimit different prostate segments either mentally or virtually and to keep track of which lesion the user has assigned to which segment. This would be even more complicated, because the magnetic resonance image datasets are three-dimensional volumes. The prostate is divided into three levels, i.e. base, mid and apex, and the user would need to keep track of which slices the user has assigned to which level to be able to scroll through the datasets more than once. Moreover, without the support apparatus 1 the internal prostate segmentation is highly user dependent and case dependent. Thus, it would be difficult to assure consistency of the subdivisions between users and even between different readings by the same user. This would make it even more difficult to draw reliable conclusions from studies involving several users or across different studies. The support apparatus 1 automatically and reliably determining the segments and visualizing these segments on the respective magnetic resonance image is therefore of great help for the evaluation and improves consistency.

The support apparatus 1 can be adapted to provide a new and flexible workflow for PI-RADS scoring, but the support apparatus 1 may also be adapted to improve orientation within the prostate during other workflows, which may simply define that it can be scrolled through the magnetic resonance slices once. The support apparatus can therefore also be adapted to support a user in a diagnosis process, which is not a process in accordance with the PI-RADS.

The segmentation unit is preferentially adapted to deduce a virtual segment subdivision, which can be used to support and/or guide diagnosis, in particular, along the PI-RADS guidelines. For generating the virtual segment subdivisions an anatomic segmentation is preferentially used such that automatically internal, virtual, three-dimensional segment boundaries can be determined, which can be used to improve the evaluation of the prostate status. A full three-dimensional evaluation is preferentially possible, wherein coronal, sagittal, skewed or other two-dimensional views may be displayed. The support apparatus preferentially provides a full three-dimensional representation of distinct segments of the prostate. Thus, the support apparatus is preferentially adapted to provide an automatic three-dimensional segmentation, which is preferentially model based, wherein the segments do not only comprise anatomical boundaries, but also virtual boundaries.

Although in above described embodiments the magnetic resonance images are T2-weighted, DWI, ADC and DCE magnetic resonance images, the image providing unit can also be adapted to provide other additional or alternative magnetic resonance images like a spectroscopic magnetic resonance image. Moreover, instead of or in addition to one or several magnetic resonance images, the image providing unit can also be adapted to provide images generated by other imaging modalities like x-ray computed tomography images, ultrasound images, nuclear images, et cetera. The image providing unit can be adapted to provide different images, which have been generated by different imaging modalities.

Although in above described embodiments the support apparatus and the support method are adapted to support a user in a diagnosis process, which relates to the prostate, in another embodiment the support apparatus and the support method can be adapted to support a user in a diagnosis process with respect to another part of a living being like another organ.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

Operations like the provision of the three-dimensional image, the determination of the three-dimensional segments, the generation of the visualization of the segments, the provision of the graphical user interface, et cetera performed by one or several units or devices can be performed by any other number of units or devices. For example, steps 101 to 104 can be performed by a single unit being a computer device or by any other number of different units. These operations and/or the control of the support apparatus in accordance with the support method can be implemented as program code means of a computer program and/or as dedicated hardware.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention relates to a support apparatus for supporting a user in a diagnosis process, especially for assisting a physician in staging prostate cancer. A segmentation unit determines three-dimensional segments of an anatomical object like a prostate based on a three-dimensional image being preferentially a magnetic resonance image, wherein the segments comprise anatomical segment boundaries and non-anatomical segment boundaries. A visualization generating unit generates a visualization of the segments in the image, a graphical user interface providing unit provides a graphical user interface allowing the user to assign scores to the determined three-dimensional segments, and a display displays the visualization and the graphical user interface. Thus, an automatic delineation of segments may be provided to which a user like a physician can assign scores, wherein based on the scores assigned to the segments a diagnosis can be performed, in particular, prostate cancer can be staged.

The invention claimed is:

1. A support apparatus for supporting a user in a diagnosis process for staging cancer of a prostate, the support apparatus comprising:
   an image providing unit for providing a three-dimensional image of the prostate as an anatomical object,
   a segmentation unit for determining three-dimensional segments of the anatomical object based on the provided three-dimensional image, wherein the three-dimensional segments comprise anatomical segment boundaries and non-anatomical segment boundaries,
   a visualization generating unit for generating a visualization of the three-dimensional segments in the image,
   a graphical user interface providing unit for providing a graphical user interface allowing the user to assign scores to the three-dimensional segments, and
   a display for displaying the visualization and the graphical user interface.

2. The support apparatus as defined in claim 1, wherein the segmentation unit is adapted to determine the three-dimensional segments by:
   providing an anatomical model of the object, wherein the anatomical model comprises anatomical segment boundaries and non-anatomical segment boundaries,
   detecting anatomical features of the anatomical object, which correspond to the anatomical boundaries of the anatomical model, in the three-dimensional image,
   adapting the anatomical model of the anatomical object by adapting the anatomical segment boundaries to the detected anatomical features, wherein the three-dimensional segments are defined by the anatomical and non-anatomical segment boundaries of the adapted anatomical model.

3. The support apparatus as defined in claim 1, wherein the support apparatus further comprises a property value determination unit for determining for a determined three-dimensional segment a property value, which is indicative of a property of the three-dimensional segment, based on image values of the three-dimensional segment.

4. The support apparatus as defined in claim 1, wherein the image providing unit is adapted to provide different images of the anatomical object, wherein the segmentation unit is adapted to determine the three-dimensional segments of the object based on one or several provided images, wherein the visualization generating unit is adapted to generate a visualization of the three-dimensional segments in the images.

5. The support apparatus as defined in claim 4, wherein the image providing unit is adapted to provide different parametric magnetic resonance images of the anatomical object.

6. The support apparatus as defined in claim 4, wherein the image providing unit is adapted to provide different images generated by different imaging modalities.

7. The support apparatus as defined in claim 4, wherein the image providing unit is adapted to register the provided images with respect to each other.

8. The support apparatus as defined in claim 7, wherein the image providing unit is adapted to provide an anatomical three-dimensional image and a functional image, wherein the image providing unit is adapted to register the anatomical image with the functional image, wherein the segmentation unit is adapted to determine the three-dimensional segments of the object based on the anatomical image and wherein the visualization generating unit is adapted to generate a visualization of the three-dimensional segments in the anatomical image and in the functional image, wherein in the functional image the three-dimensional segments are visualized based on the registration between the anatomical image and the functional image.

9. The support apparatus as defined in claim 1, wherein the graphical user interface providing unit is adapted to provide a graphical user interface allowing the user to modify the three-dimensional segments.

10. The support apparatus as defined in claim 1, wherein the visualization generating unit and the graphical user interface providing unit are adapted to allow the user to view the three-dimensional segments and assign scores to the three-dimensional segments in an arbitrary order, wherein the visualization generating unit is adapted to generate a visualization indicating remaining segments to which a score has not been assigned.

11. The support apparatus as defined in claim 1, wherein the graphical user interface providing unit is adapted to provide a graphical user interface allowing the user to indicate that the assignment of a score to a segment has been completed, wherein the visualization generating unit is adapted to generate a visualization visualizing for which segments the assigning of scores has been completed.

12. The support apparatus as defined in claim 1, wherein the support apparatus further comprises a report generation unit for generating a report about the diagnosis process based on the assignments between scores and segments.

13. The support apparatus as defined in claim 1, wherein the support apparatus further comprises a workflow providing unit for providing a workflow of tasks defining an order of visualizing the three-dimensional segments, wherein the visualization generating unit is adapted to generate visualizations of the three-dimensional segments in accordance with the order defined by the workflow.

14. A support method for supporting a user in a diagnosis process for staging cancer of a prostate, the support method comprising:
   providing a three-dimensional image of the prostate as an anatomical object by an image providing unit,
   determining three-dimensional segments of the anatomical object based on the provided three-dimensional image by a segmentation unit, wherein the three-dimensional segments comprise anatomical segment boundaries and non-anatomical segment boundaries,
   generating a visualization of the three-dimensional segments in the image by a visualization generating unit,
   providing a graphical user interface allowing the user to assign scores to the three-dimensional segments by a graphical user interface providing unit, and
   displaying the visualization and the graphical user interface by a display.

15. A non-transitory computer-readable medium embodied with a support computer program for supporting a user in a diagnosis process for staging cancer of a prostate, wherein the support computer program comprises program code for causing a support apparatus to carry out the steps of a support method according to claim 14, in response to the support computer program being run on a computer configured to control the support apparatus.

* * * * *